United States Patent [19]

Hassler et al.

[11] Patent Number: 5,751,795
[45] Date of Patent: May 12, 1998

[54] BROADCASTING OF INFORMATION THROUGH TELEPHONE SWITCHING SYSTEM DISPLAY MESSAGES

[75] Inventors: Kerry Wayne Hassler; Paul Lawrence Richman, both of Boulder, Colo.

[73] Assignee: Lucent Technologies Inc., Murray Hill, N.J.

[21] Appl. No.: 514,327

[22] Filed: Aug. 11, 1995

[51] Int. Cl.$^6$ ............................................. H04M 11/00
[52] U.S. Cl. ............................... 379/93.17; 379/265
[58] Field of Search ................................ 379/96, 93, 94, 379/265, 309, 93.17, 93.18, 93.21, 93.23, 93.24, 93.25, 93.14, 93.01

[56] References Cited

U.S. PATENT DOCUMENTS

| | | | |
|---|---|---|---|
| 4,748,656 | 5/1988 | Gibbs et al. | 379/93 |
| 5,127,047 | 6/1992 | Bell et al. | 379/93 |
| 5,239,460 | 8/1993 | LaRoche | 364/401 |
| 5,373,549 | 12/1994 | Bales et al. | 379/93 |
| 5,429,220 | 7/1995 | Moskowitz et al. | 379/96 |
| 5,490,211 | 2/1996 | Adams et al. | 379/265 |
| 5,499,291 | 3/1996 | Kepley | 379/265 |

OTHER PUBLICATIONS

H. Newton, *A Microsoft Fantasy*, Computer Telephony, Jan./Feb. 1994, pp. 9, 10, 12, 15–16.
"Definity Communications System", Generic 3, Feature Description, vol. 1, AT&T 555-230-204CI, Issue 2, Sep. 1995, pp. 3–117–3–124 and pp. 3–826–3–830.

L. J. Kanow, *Automatic Call Distribution Services in the ROLM® CBX*, ICC '80 1980 International Conference on Communications Pt. II, Seattle, WA, 8–12 Jun. 1980 (New York, IEEE 1980), pp. 19.4.1–7.

*Primary Examiner*—Stella Woo
*Attorney, Agent, or Firm*—David Volejnicek

[57] ABSTRACT

A telephone switching system (100), such as an ACD switching system in a call center, is used to broadcast information for users, such as displayable messages, to telecommunications terminals (110–112, 212), such as display telephones or data terminals, of a plurality of the users, such as call center agents, by means of non-call-associated display messages that are transmitted over the terminals' telephone lines (120–122), at the request of one of the users, such as the supervisor of the call center. The one of the users requests the broadcast either by depressing a predetermined button on their terminal accompanied by dialing a message identifier, or by dialing a feature access code and a message identifier, or by sending an ISDN "userinfo" or DCP "route text message" message that contains the information for users. The switching system uses either stored data or data contained in the request to determine the destinees of the information for users. The switching system then broadcasts the information in either an ISDN "userinfo" or "notify" message or a DCP "text" message to the destinees' terminals for displaying to the users of those terminals.

13 Claims, 3 Drawing Sheets

BROADCASTING OF INFORMATION THROUGH TELEPHONE SWITCHING SYSTEM DISPLAY MESSAGES

TECHNICAL FIELD

This invention relates to telephone switching systems, and to call center applications of telephone switching systems.

BACKGROUND OF THE INVENTION

Call centers are systems that enable a group of agents to serve incoming and/or outgoing calls, with the calls being distributed and connected to whichever of the agents happen to be available at the time of the call. The call-distribution function, commonly referred to as automatic call distribution (ACD) is generally implemented in software that executes either in a stored-program-controlled switching system, such as a private branch exchange (PBX), that effects the call connections between agents' telephones and external telephone lines, or in an adjunct processor of the switching system.

In most business applications of call centers, agents need to have access to databases of information, such as calling and/or called party account information. For this purpose, the agents are provided with data terminals by means of which they access information databases. In most business applications of call centers, the agents must also have access to non-database information, such as changing up-to-the-minute (i.e., real-time, or current) information, in order to serve calls properly. For example, the agents in a sales call center must immediately be informed if the price or availability of a product changes, even before the database can be modified to reflect these changes. The agents in a multi-purpose call center must be informed if and when they are being switched from handling calls of one purpose to handling calls of another purpose (i.e., being shifted from one agent pool or "split" to another). Or, real-time motivational information may need to be conveyed to the agents to motivate them to strive for peak performance, as disclosed in U.S. Pat. No. 5,239,460.

In conventional call centers, the non-database information is conveyed to the agents in a variety of unsatisfactory ways. For example, the supervisor of the call center must walk over to individual agents, or place telephone calls to the individual agents, and pass on the information to the agents orally. If the information must be conveyed to a plurality of agents, the serial contacting of individual agents is an inefficient and duplicative process that wastes the supervisor's time and undesirably delays the conveyance of the information to at least some of the agents. Alternatively, the information may be broadcast over a public announcement system or may be displayed on a large wall display at the front of the call center. But the audio information may be drowned out by noise or blocked by the agents' telephone head sets, and the visual information may be blocked by physical obstacles such as pillars and cubicle partitions or may simply be missed by agents who do not look up. Also, these information conveyance mechanisms make it difficult if not impossible to target the information to only selected ones of the agents.

In the last decade or so, computer-telephony integration (CTI) has come to be employed in some call centers. As it is typically implemented in call centers, CTI employs a server that conveys telephony information, such as the telephone number of the calling or called person and the identity of the agent to whom the call is connected, from the ACD switching system to a host computer, whereupon the host computer uses this information to send relevant database information, such as the account file on the calling or called person, across a data local area network (LAN) to a data terminal of the agent to whom the call is connected, for displaying the information to the agent on the agent's data terminal. The server and/or the host computer and the data LAN can be used to convey other, non-database, information as well to the data terminals of the agents.

CTI is not universally employed in call centers. For example, some call centers predate the availability of CTI, and either are not suited to, or are unwilling to incur the expense of, having CTI retrofitted. Other call centers are even today being installed without CTI, largely for cost reasons. These non-CTI call centers continue to rely on the telephone as the main agent terminal for non-database information. These call centers remain dependent on the unsatisfactory mechanisms described above to convey information other than database information to agents.

SUMMARY OF THE INVENTION

This invention is directed to solving these and other problems and disadvantages of the prior art. Generally according to the invention, a telephone switching system—illustratively an ACD switching system in a call center—is used to broadcast information for users—illustratively displayable messages—to telecommunication terminals—illustratively display telephones—of a plurality of the users—illustratively some or all of the agents in the call center—by means of non-call-associated display messages transmitted over telephone lines, at the request of one of the users—illustratively the supervisor of the call center. The one of the users either may specify the destinees of the information to the telephone switching system, or may rely upon the telephone switching system to determine the destinees. Advantageously, non-database information may thus be distributed to call center agents, particularly in non-CTI call centers, without additions to, or significant changes in, the existing call center infrastructure. Further advantageously, the information may be distributed only to selected agents, and substantially simultaneously to all selected agents, without reliance on the unsatisfactory prior art conveyance mechanisms, in a manner that is highly likely to catch the destinee agents' attention, and in a manner that unburdens the call center supervisor.

Specifically according to one aspect of the invention, a telephone switching system that is connectable to a plurality of user telecommunications display terminals via a plurality of telephone lines each leading from the telephone switching system to a different one of the display terminals for connecting telephone calls to or from the display terminals via the telephone lines, comprises an arrangement that responds to a request received from one of the terminals by forming a non-call-associated display message, and an arrangement that responds to the forming by broadcasting the formed message from the switching system over multiple ones of the telephone lines to multiple ones of the display terminals to cause contents of the display message to be displayed at the multiple ones of the display terminals.

According to another aspect of the invention, a telecommunications system comprises a plurality of user telecommunications terminals each having a display, a plurality of telephone lines each connected to a different one of the terminals, and a telephone switching system connected to the telephone lines for connecting telephone calls to or from the terminals via the telephone lines and including an arrangement that responds to a request received from one of the terminals by broadcasting a non-call-associated display message from the switching system over multiple ones of the telephone lines to multiple ones of the terminals to cause contents of the display message to be displayed on the displays of the multiple ones of the terminals.

According to yet another aspect of the invention, a method of broadcasting messages for users in a telecommunications system comprising a plurality of user telecommunications terminals each having a display, a plurality of telephone lines each connected to a different one of the terminals, and a telephone switching system connected to the telephone lines for connecting telephone calls to or from the terminals via the telephone lines, comprises the steps of receiving a request from one of the terminals at the switching system, in response forming at the switching system a non-call-associated display message containing a message for users, and in response broadcasting the formed message from the switching system over multiple ones of the telephone lines to multiple ones of the terminals to cause the contained message for users to be displayed on the displays of the multiple ones of the terminals.

These and other advantages and features of the invention will become more apparent from the following description of an illustrative embodiment of the invention taken together with the drawing.

DETAILED DESCRIPTION

Figures 1, 2:
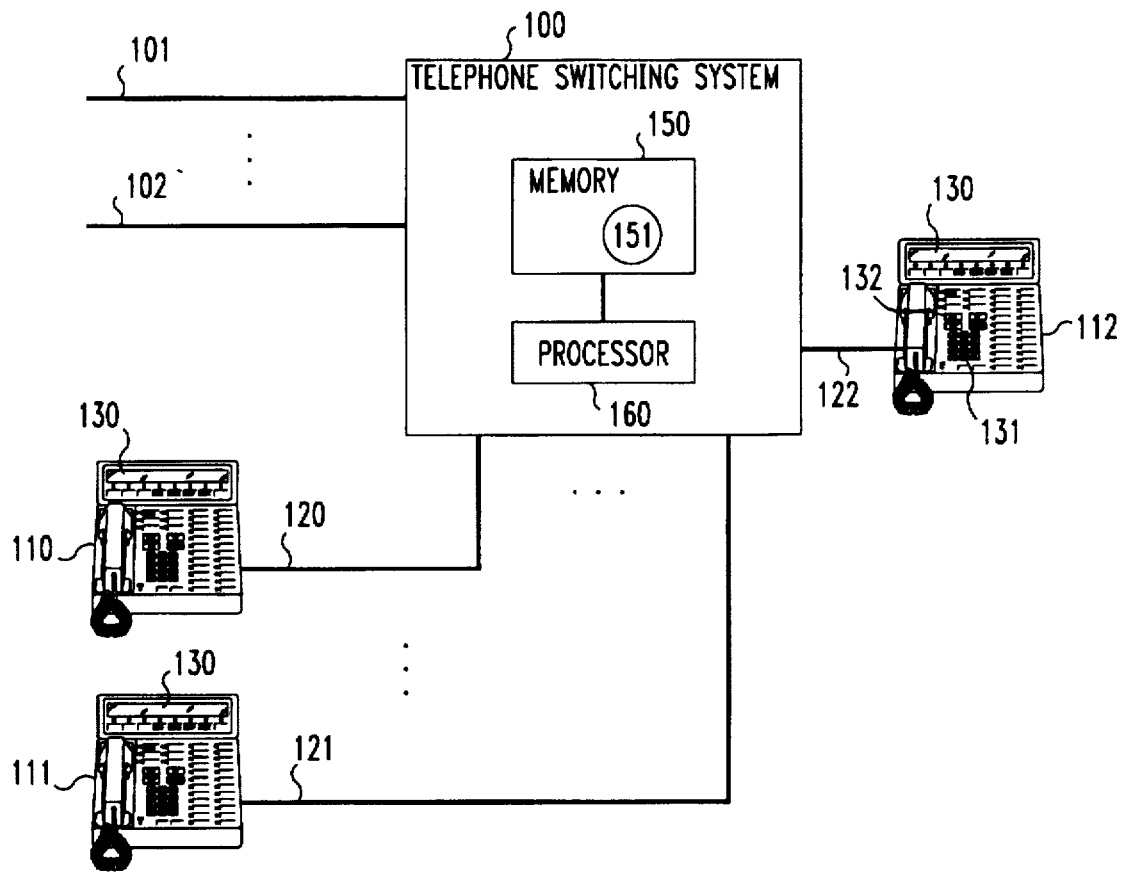
FIG. 1 is a block diagram of a telecommunications system that includes a first illustrative embodiment of the invention.
FIG. 2 is a block diagram of a message table of a broadcast function of the system of FIG. 1.

FIG. 1 shows a substantially-conventional telecommunications system. It may be a call center. Or it may be a public or a private telephone system. It comprises a telephone switching system 100 which interconnects one or more telephone trunks 101–102 with a plurality of display telephones 110–112 through a plurality of telephone lines 120–122 that connect display telephones 110–112 to telephone switching system 100. Telephone switching system 100 conventionally connects calls to or from display telephones 110–112 via telephone lines 120–122. As its name implies, each display telephone 110–112 has a single-line or a multi-line display 130 which is conventionally used to display the calling and/or called party's telephone number and/or name. In the case of a call center, telephone switching system 100 is an ACD switching system, display telephones 110–111 are the agents' terminals, and display telephone 112 is the supervisor's terminal. In the case of a private or a public telephone system, telephone switching system is a PBX or a telephone central office, respectively, display telephones 120–121 are subscribers' telephone terminals, and display telephone 122 is a system administrator's terminal. Telephone switching system 100 is a stored-program-controlled system that stores control programs in a memory 150 and executes them on a processor 160. Such systems are well known in the art.

According to the invention, control programs stored in memory 150 include a broadcast program 151. Broadcast program 151 includes a message table 200 shown in FIG. 2. Message table 200 has a plurality of message entries 201. Each message entry 201 includes a message field 203 that stores a predefined (e.g., user defined) message, an identifier field 202 that stores a unique identifier of the message, and a destinee field 204 that directly or indirectly identifies the intended recipients of the message. For example, destinee field 204 may contain the telephone numbers of the intended recipients. Or, destinee field 204 may contain a pointer to a list of recipients' phone numbers. Or, destinee field 204 may contain a pointer to a function that, when executed, determines the intended recipients. Or, destinee field 204 may contain a list of criteria on the basis of which the intended recipients are to be selected. Telephone switching system 100 conventionally has knowledge of subscriber or agent states and characteristics from which it is able to make the requisite determinations of destinees. The contents of table 200 are programmable, either by an administrator of the system of FIG. 1 or by the user of display telephone 112.

Figure 3:
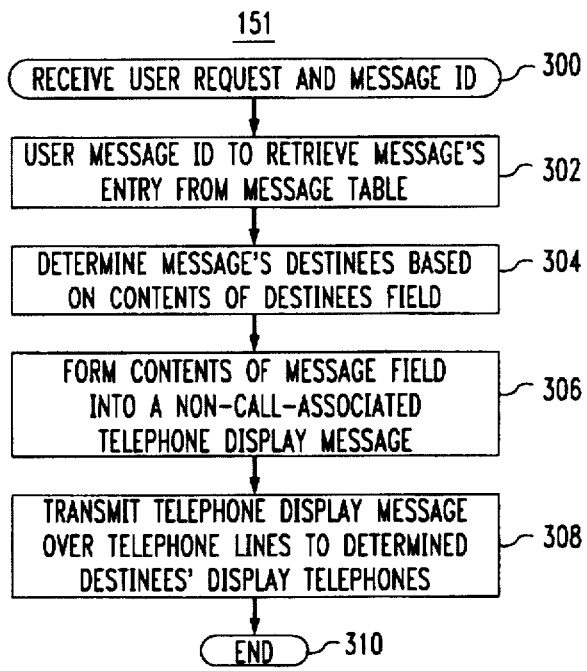
FIG. 3 is a flow diagram of the broadcast function of the system of FIG. 1.

The functionality of broadcast program 151 is flowcharted in FIG. 3. When the user of display telephone 112 decides to send one of the predefined messages to other users, he or she either enters a feature access code (FAC) followed by the identifier of the desired message on Touch-Tone keypad 131 of telephone 112, or pushes a predetermined feature button 132 on telephone 112 and then enters the identifier of the desired message on Touch-Tone keypad 131. These actions serve as a request to telephone switching system 100 to send the identified message to the message's destinees. This action is detected by telephone switching system 100 in the conventional manner, and causes telephone switching system 100 to invoke execution of broadcast program 151 on processor 160, at step 300. In response, processor 160 uses the received message ID to retrieve the corresponding entry 201 from message table 200. Processor 160 then uses the contents of destinee field 204 of the retrieved entry 201 to determine who will receive the message. For example, if destinee field 204 either contains telephone numbers or a pointer to a list of telephone numbers, or specifies all users, the message will be sent either to the listed telephone numbers or to all phone numbers served by telephone switching system 100, respectively. Or, if destinee field 204 specifies that the message should be sent to all users who are presently engaged in telephone calls, processor 160 determines in a conventional manner which telephone lines 120–121 are presently marked as busy in telephone switching system 100, and send the message across those lines. Or, if destinee field 204 specifies that the message should be sent to call center agents who are assigned to a particular "split", or to call center agents who possess a particular agent skill, or simply to all agents who are supervised by the particular supervisor from whom the request was received at step 300, processor 160 accesses conventional records of the call center's ACD switching system 100 to make the requisite determination.

Having determined the intended message recipients at step 304, processor 160 now takes the contents of message field 203 of the retrieved entry 201 and forms it into a non-call-associated telephone display message, at step 306. Like a conventional telephone display message, the message formed at step 306 commands a receiving display telephone to display the message contents on display 130. Unlike most conventional telephone display messages, the message formed at step 306 is not designed to be transmitted to only a single telephone, but rather is intended to be broadcast to a plurality or even all of the telephones 110–111. Further unlike most conventional telephone display messages, the message formed at step 306 is not associated with any call that the receiving commencing to one is commencing to engage in or is engaged in. In other words, the non-call-associated message is not a part of the setup of a call or a part of an ongoing call that involves the receiving display telephone. Rather, it is independent of any call that involves the receiving display telephone, and is likewise independent of whether or not there even is or is not a call being initiated or in existence that involves the receiving display telephone. And unlike most conventional non-call associated messages (such as "leave-word calling" messages and date/time display messages), its transmission to the recipient is effected automatically in response to the sender's request and not in response to a request received from the recipient. If telephone lines 120–121 are ISDN telephone lines, the display message formed at step 306 is illustratively an ISDN "userinfo" or "notify" message. If telephone lines 120–121 are AT&T digital signaling protocol (DSP) telephone lines, the display message formed at step 306 is a "text" message.

Having formed the display message at step 306, processor 160 now causes telephone switching system 100 to transmit the display message over those telephone lines 120–121 that lead to display telephones of the determined intended recipients of the message, at step 308. Upon receipt at each individual display telephone, the message is displayed to the user of the display telephone on display 130. The function of broadcast program 151 is thus completed, and its execution ends, at step 310.

While the implementation disclosed in FIG. 1 is general in that it can be implemented in substantially any telephone system, it is limiting in that it limits sending of messages only to those messages and to those destinees that are specified in message table 200, in that it requires the use of display telephones, and in that the length of the sent message is limited to the size of the telephones' display 130. (Alternatively, a longer message must be sent as a series of display messages each conveying a message segment.)

Figure 4:
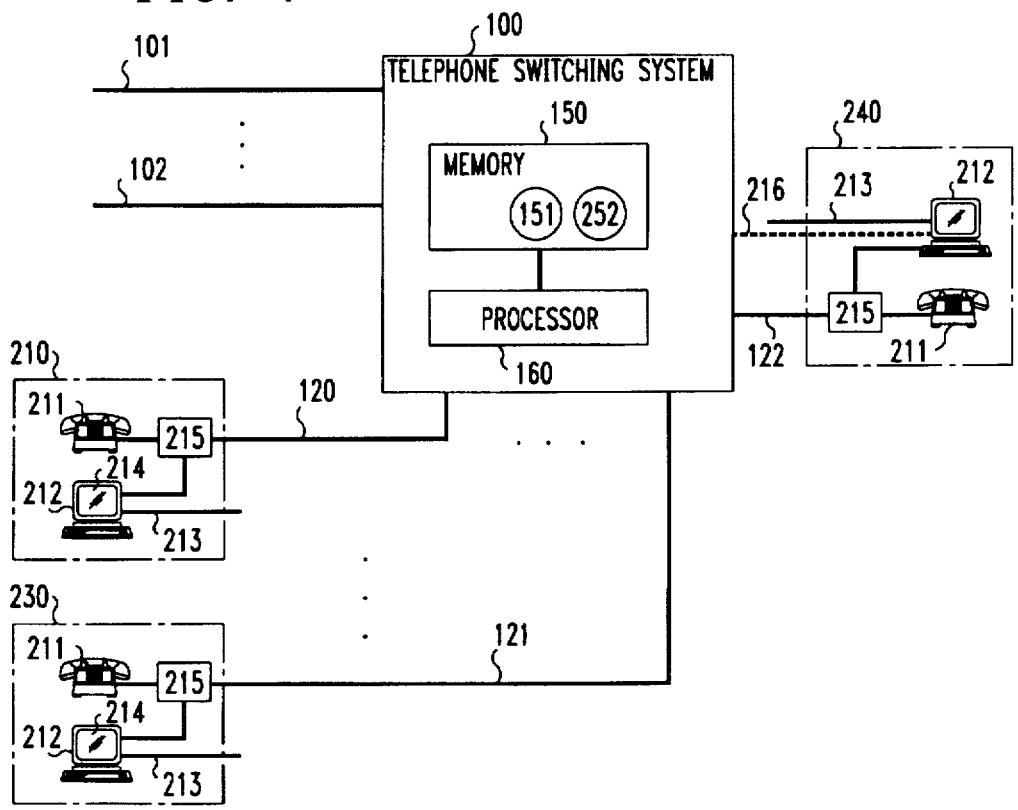
FIG. 4 is a block diagram of a telecommunications system that includes a second illustrative embodiment of the invention.

Accordingly, FIG. 4 shows an alternative implementation which removes these limitations. Elements in FIG. 4 that are identical to those in FIG. 1 retain their numerical designations from FIG. 1. The implementation of FIG. 4 is likely to be used in a call center, where agents are already equipped with intelligent data terminals 212, such as personal computers, for accessing information in a database over data links 213. In this implementation, each agent position 210–230 is equipped with an intelligent data terminal 212 and a conventional telephone 211. Since each data terminal 212 has a full screen display 214, these large displays will be used to display messages, and hence display telephones are no longer needed. At each agent position, data terminal 212 is connected to the same telephone line as the telephone 211 by an interface 215, as taught by U.S. Pat. No. 4,748, 656. Illustratively, interface 215 is the AT&T PassageWay device or the AT&T PC-PBX Connection device.

The supervisor's position 240 is equipped and configured in the same manner. Additionally, data terminal 212 may be connected by a conventional control communication link 216 to telephone switching system 100. Link 216 may be a standard service-provider interface (SPI) data link. In the case of system 100 being an AT&T System 75 or 85 or Definity® PBX, link 216 is preferably an AT&T DCIU or ASAI data link.

From the standpoint of the user of supervisor's position 240, the system of FIG. 4 allows for the same type of operation as the system in FIG. 1: the user may trigger sending of a message from message table 200 by pushing a feature button or dialing a FAC, followed by dialing a message ID, on telephone 211. Furthermore, the system of FIG. 4 allows for expanded operation wherein, instead of relying on the contents of message table 200, the user of supervisor's position 240 is able to specify to telephone switching system 100 both the message to be sent and the destinees, or criteria for determining the destinees, of the message, on a message-by-message basis.

In order to effect this capability over a control communication link 216 or an ISDN telephone line 122, no changes to conventional protocols are needed. For example, on ISDN telephone line 122, the requisite information is conveyed from supervisor's position 240 to telephone switching system 100 via ISDN "userinfo" messages. However, in order to effect this capability over a DCP telephone line 122, the standard DCP protocol is extended by the addition of a new "route text message" message 500, which is shown in FIG. 5.

"Route text message" message 500 supplies to telephone switching system 100 the characters of the message that is to be broadcast and the following one or more items of destinee information: a) the type of internal switch routing for the message (i.e., whether the message is to be sent to all or only some agents in the system), b) a list of specific terminal ID's or agent's log-in ID extensions, if only some agents are to receive the message, c) a list of agent groups (e.g., splits or skills), if only one or more groups of agents are to receive the message, and d) the "work mode" status of the agents who are to receive this message.

Figure 5:
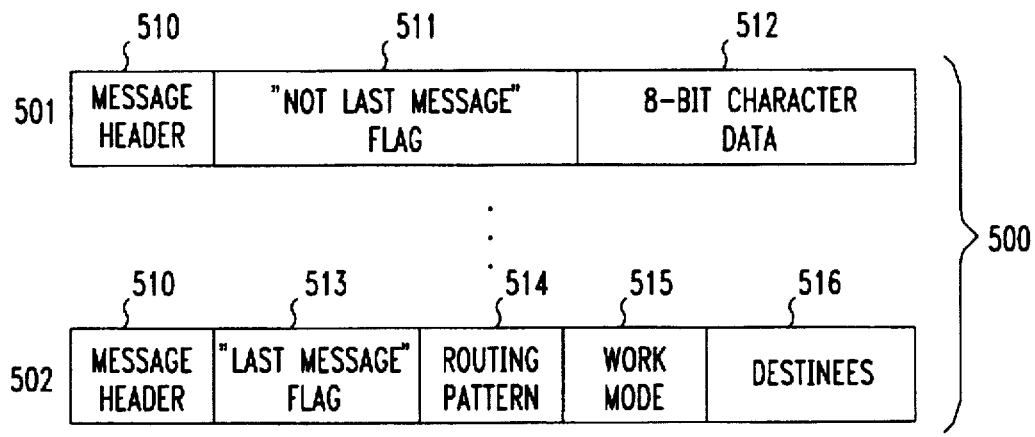
FIG. 5 is a block diagram of a DCP protocol "route text message" message of the system of FIG. 4.

As shown in FIG. 5, "route text message" message 500 actually comprises a plurality of related messages: one or more "not last" messages 501, followed by one "last" message 502. Each "not last" message 501 has a standard DCP protocol message header 510, a "not last message" flag 511 that identifies it as a "not last" message, and a data field 512 of up to 29 bytes of character data. "Last" message 502 has the standard DCP protocol message header 510, a "last message" flag 513 that identifies it as a "last" message, a routing pattern field 514 that indicates the internal switch routing for the message (such as "route to all", "route to agent extensions", or "route to agent groups"), a work mode field 515 that indicates the work mode of intended message destinees (such as "route to agents in auto-in/manual-in work mode", "route to agents in auxiliary work mode", "route to agents in after-call work mode", or "route to all") and a destinees field 516 that provides up to 27 bytes of other destinee-identifying information, such as agents' log-in ID extensions or agent group lists.

Figure 6:
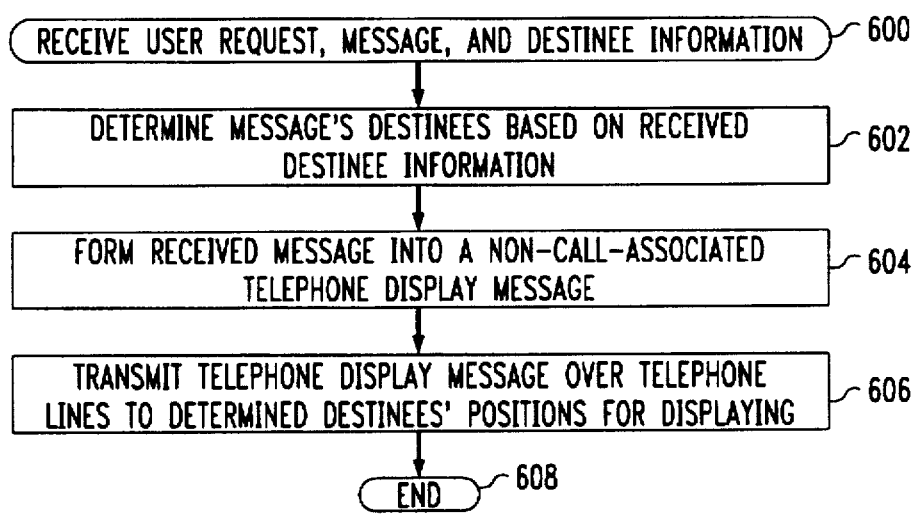
FIG. 6 is a flow diagram of a broadcast function of the system of FIG. 4.

In addition to program 151, memory 150 in FIG. 4 stores a broadcast program 252, whose function is flowcharted in FIG. 6. When the call center supervisor/user of supervisor's position 240 decides to send either a message that is not in table 200 or a message that is in table 200 but to different destinees than are specified in table 200, he or she composes the message on data terminal 212, specifies either the destinees or the criteria for determining the destinees on data terminal 212, and causes this information to be conveyed to telephone switching system over control data link 216, or over telephone line 122 via a "userinfo" or "route text message" message. These actions serve as a request to telephone switching system 100 to send the message to the destinees. The sent information is received by telephone switching system 100 and causes switching system 100 to invoke execution of broadcast program 252 on processor 160, at step 600. In response, processor 160 determines on the basis of the received destinee information who will receive the message, at step 602. The determination is done in the same manner as was described for step 304 of FIG. 3. Processor 160 then takes the received message and forms it into a non-call-associated telephone display message, at step 604. The formed display message is the same as described for step 306 of FIG. 3. Processor 160 then causes telephone switching system 100 to transmit the display message over those telephone lines 120–121 that lead to agent positions of the determined intended recipients of the message, at step 606. At each destinee agent position, the display message is received by interface 215 and is redirected to data terminal 212, in the manner taught by the above-referenced U.S. Pat. No. 4,748,656, and is displayed by data terminal 212 on its display 214. The function of broadcast program 252 is thus completed, and its execution ends, at step 608.

Of course, various changes and modifications to the illustrative embodiment described above will be apparent to those skilled in the art. For example, each entry of the message table may further include a return address field, for implementing a "return reply to sender" option whereby the sender of the message can poll message recipients for responses to the sent message. Such changes and modifications can be made without departing from the spirit and the scope of the invention and without diminishing its attendant advantages. It is therefore intended that such changes and modifications be covered by the following claims.

The invention claimed is:

1. A telecommunications system comprising:

a plurality of user telecommunications terminals each having a display;

a plurality of telephone lines each connected to a different one of the terminals;

a telephone switching system connected to the telephone lines for connecting telephone calls to or from the terminals via the telephone lines;

a plurality of stored predetermined messages for users, each message identifiable by a corresponding message identifier and having corresponding stored predetermined information that indicates destinees of said each message; and means responsive to receipt of a request accompanied by a message identifier from one of the terminals, said request consisting of either a feature access code input on the one terminal by a user of the one terminal or a notification of actuation of a predetermined actuator of the one terminal by the user of the one terminal, for retrieving the stored predetermined message for users that corresponds to the received message identifier, forming the retrieved message for users into a non-call-associated display message, determining the destinees of the retrieved message for users from the stored predetermined information that corresponds to the retrieved message for users, and broadcasting the formed non-call-associated display message to those of the plurality of terminals that correspond to the determined destinees to cause the retrieved message for users to be displayed on the displays of the terminals that correspond to the determined destinees.

2. The system of claim 1 wherein:

the plurality of terminals comprise display telephones.

3. The system of claim 1 wherein:

the plurality of terminals comprise data terminals and interface means for coupling the data terminals to the telephone lines.

4. The system of claim 1 wherein:

the system comprises a call center;

the plurality of terminals comprise call center agents' terminals;

the telephone switching system comprises an automatic call distribution system; and the one of the terminals comprises a call center supervisor's terminal.

5. The system of claim 1 wherein:

the display message comprises one of an ISDN "userinfo" message, an ISDN "notify" message, and a DCP "text" message.

6. The system of claim 5 wherein:

the request comprises one of an ISDN "userinfo" message and a DCP "route text message" message.

7. The system of claim 1 wherein:

the means are further responsive to receipt from one of the terminals of a message for users accompanied by information that indicates destinees of the received message for users, for determining the destinees of the received message for users from the received accompanying information, forming the received message for users into the non-call-associated display message, and broadcasting the formed non-call-associated display message to those of the plurality of terminals that correspond to the determined destinees to cause the received message for users to be displayed on the displays of the terminals that correspond to the determined destinees.

8. A telephone switching system connectable to a plurality of user telecommunications display terminals via a plurality of telephone lines each leading from the telephone switching system to a different one of the display terminals for connecting telephone calls to or from the display terminals via the telephone lines, the telephone switching system comprising:

a plurality of stored predetermined messages for users, each message identifiable by a corresponding message identifier and having corresponding stored predetermined information that indicates destinees of said each message;

first means responsive to receipt of a request accompanied by a message identifier from one of the terminals, said request consisting of either a feature access code input on the one terminal by a user of the one terminal or a notification of actuation of a predetermined actuator of the one terminal by the user of the one terminal, for retrieving the stored predetermined message for users that corresponds to the received message identifier and forming the retrieved message for users into a non-call-associated display message; and second means for determining the destinees of the retrieved message for users from the stored predetermined information that corresponds to the retrieved message for users and broadcasting the formed non-call-associated display message to those of the plurality of display terminals that correspond to the determined destinees to cause the retrieved message for users to be displayed at the display terminals that correspond to the determined destinees.

9. The telephone switching system of claim 8 wherein:

the telephone switching system is a call center automatic call distribution system for distributing telephone calls to or from call center agents' terminals and a call center supervisor's terminal; and the first means is responsive to the request which is received from the call center supervisor's terminal.

10. The telephone switching system of claim 8 wherein:

the display message comprises one of an ISDN "userinfo" message, an ISDN "notify" message, and a DCP "text" message.

11. The telephone switching system of claim 10 wherein:

the request comprises one of an ISDN "userinfo" message and a DCP "route text message" message.

12. The telephone switching system of claim 8 wherein:

the first means are further responsive to receipt from one of the terminals of a message for users accompanied by information that indicates destinees of the received message for users, for forming the received message for users into the non-call-associated display message; and the second means are further for determining the destinees of the received message for users from the received accompanying information and broadcasting the formed non-call-associated display message to those of the plurality of terminals that correspond to the determined destinees to cause the received message for users to be displayed at the display terminals that correspond to the determined destinees.

13. A method of broadcasting messages for users in a telecommunications system comprising a plurality of user telecommunications terminals each having a display, a plurality of telephone lines each connected to a different one of the terminals, and a telephone switching system connected to the telephone lines for connecting telephone calls to or from the terminals via the telephone lines, the method comprising the steps of:

a user of one of the terminals making a request accompanied by a message identifier by either inputting a feature access code on the one terminal or actuating a predetermined actuator of the one terminal;

in response to the making, the one terminal sending the request accompanied by the message identifier to the switching system, the request consisting of either the feature access code or notification of the actuation;

receiving the request accompanied by the message identifier from the one of the terminals at the switching system;

in response to the receipt, retrieving a stored predetermined message for users that corresponds to the received message identifier from a plurality of stored predetermined messages for users, wherein each message is identifiable by a corresponding said message identifier and has corresponding predetermined information that indicates destinees of said each message;

forming at the switching system a non-call-associated display message containing the retrieved message for users;

determining the destinees of the retrieved message for users from the stored predetermined information that corresponds to the retrieved message for users; and in response to the forming, broadcasting the formed message from the switching system over multiple ones of the telephone lines to those multiple ones of the terminals that correspond to the determined destinees to cause the contained message for users to be displayed on the displays of the multiple ones of those terminals.

\* \* \* \* \*